(12) United States Patent
Huang et al.

(10) Patent No.: US 12,556,246 B2
(45) Date of Patent: Feb. 17, 2026

(54) BEAMSPACE COMPRESSION IN AN OPEN-RADIO ACCESS NETWORK

(71) Applicant: Telefonaktiebolaget LM Ericsson (publ), Stockholm (SE)

(72) Inventors: Yezi Huang, Täby (SE); Chenguang Lu, Sollentuna (SE); Miguel Berg, Sollentuna (SE); Björn Pohlman, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 10 days.

(21) Appl. No.: 18/695,447

(22) PCT Filed: Sep. 6, 2022

(86) PCT No.: PCT/EP2022/074734
§ 371 (c)(1),
(2) Date: Mar. 26, 2024

(87) PCT Pub. No.: WO2023/046462
PCT Pub. Date: Mar. 30, 2023

(65) Prior Publication Data
US 2024/0421867 A1 Dec. 19, 2024

Related U.S. Application Data

(60) Provisional application No. 63/248,791, filed on Sep. 27, 2021.

(51) Int. Cl.
*H04B 7/0456* (2017.01)
*H04B 7/0452* (2017.01)

(52) U.S. Cl.
CPC ......... *H04B 7/0469* (2013.01); *H04B 7/0452* (2013.01)

(58) Field of Classification Search
CPC .. H04B 7/0469; H04B 7/0452; H04B 7/0634; H04B 7/0663; H04B 7/022
See application file for complete search history.

(56) References Cited

U.S. PATENT DOCUMENTS

| | | | |
|---|---|---|---|
| 2019/0341985 A1* | 11/2019 | Chopra | H04B 7/0639 |
| 2019/0393945 A1 | 12/2019 | Cavalcante et al. | |

(Continued)

FOREIGN PATENT DOCUMENTS

| | | |
|---|---|---|
| EP | 3836420 A1 | 6/2021 |
| WO | 2020031710 A1 | 2/2020 |
| WO | 20200256609 A1 | 12/2020 |

OTHER PUBLICATIONS

International Search Report and Written Opinion of the International Searching Authority, PCT/EP2022/074734, mailed Jan. 23, 2023, 20 pages.

(Continued)

*Primary Examiner* — Vineeta S Panwalkar
(74) *Attorney, Agent, or Firm* — Sage Patent Group

(57) ABSTRACT

A first network entity of a communications network can generate compressed beamforming weights ("BFWs") based on a transformation configuration. The transformation configuration can be based on one or more parameters of an antenna array associated with a second network entity of the communications network. The one or more parameters can include a parameter that is separate from a total number of antenna ports in the antenna array. The first network entity can further transmit an indication of the compressed BFWs to the second network entity via a fronthaul between the first network entity and the second network entity.

22 Claims, 13 Drawing Sheets

(56) References Cited

U.S. PATENT DOCUMENTS

2021/0135722 A1    5/2021  Ahmed et al.
2021/0266788 A1    8/2021  Takano
2022/0123812 A1*   4/2022  Österling ............. H04B 7/0634

OTHER PUBLICATIONS

O-Ran Alliance E.V, O-RAN.WG4.CUS.0-V06.00; O-Ran Fronthaul Working Group; Control, User and Synchronization Plane Specification, Sep. 24, 2021, 298 pages.
Office Action for Japanese Patent Application No. 2024-518852 dated Mar. 18, 2025, 8 pages.
1 Bangladesh Office Action, Bangladesh Patent Application No. BD-P-2022-305, mailed Sep. 29, 2025, 1 page.

* cited by examiner

| Antenna configuration | Transformation matrix |
|---|---|
| $P=1, M>1, N=1$ | $F = D_M$ |
| $P=1, M=1, N>1$ | $F = D_N$ |
| $P=1, M>1, N>1$ | $F = D_N \otimes D_M$ |
| $P=2, M>1, N>1$ | $F = I_2 \otimes D_N \otimes D_M$ |
| ... | ... |

FIG. 7

| Transformation index | Transformation matrix |
|---|---|
| 0 | $F = I_K$ |
| 1 | $F = D_M$ |
| 2 | $F = D_N$ |
| 3 | $F = D_N \otimes D_M$ |
| 4 | $F = I_2 \otimes D_N \otimes D_M$ |
| ... | ... |

FIG. 8

BEAMSPACE COMPRESSION IN AN OPEN-RADIO ACCESS NETWORK

CROSS REFERENCE TO RELATED APPLICATIONS

This application is a 35 U.S.C. § 371 national stage application of PCT International Application No. PCT/EP2022/074734 filed on Sep. 6, 2022, which in turn claims domestic priority to U.S. Provisional Patent Application No. 63/248,791, filed on Sep. 27, 2021, the disclosures and content of which are incorporated by reference herein in their entirety.

TECHNICAL FIELD

The present disclosure is related to wireless communication systems and more particularly to beamspace compression in an open-radio access network ("O-RAN").

BACKGROUND

FIG. 1 illustrates an example of a new radio ("NR") network (e.g., a 5th Generation ("5G") network) including a 5G core ("5GC") network 130, network nodes 120a-b (e.g., 5G base station ("gNB")), multiple communication devices 110 (also referred to as user equipment ("UE")).

Massive multiple-input multiple-output ("MIMO") techniques were first adopted to practice in long term evolution ("LTE") networks. In $5^{th}$ generation ("5G") networks, it has become a key technology component, which will be deployed in a much larger scale than in LTE. It features with a large number of antennas used on the base-station side, where the number of antennas is typically much larger than the number of user-layers, for example, 64 antennas serving 8 or 16 user-layers in frequency range 1 ("FR1") (which includes sub-6 GHz frequency bands) and 256/512 antennas serving 2 or 4 layers in frequency range 2 ("FR2") (which includes frequency bands from 24.25 GHz to 52.6 GHz).

SUMMARY

According to some embodiments, a method of operating a first network entity of a communications network is provided. The method includes generating compressed beamforming weights ("BFWs") based on a transformation configuration. The transformation configuration can be based on one or more parameters of an antenna array associated with a second network entity of the communications network. The one or more parameters can include a parameter that is separate from a total number of antenna ports in the antenna array. The method further includes transmitting an indication of the compressed BFWs to the second network entity via a fronthaul between the first network entity and the second network entity.

According to other embodiments, a method of operating a first network entity of a communications network is provided. The method includes receiving sounding reference signa ("SRS") in-phase and quadrature ("IQ") data from a second network entity operating in the communications network. The method further includes determining channel estimates between the second network entity and a communication device in the communications network based on the SRS IQ data. The method further includes storing the channel estimates in a local memory. The method further includes determining scheduling information associated with downlink data to be transmit to the communication device based on the channel estimates. The method further includes performing an antenna-space to beam-space transformation on the channel estimates to generate beam-space channel estimates. The method further includes determining beam-space beamforming weights ("BFWs") based on the beam-space channel estimates and the scheduling information. The method further includes performing beam selection on at least one of: the beam-space channel estimates; and the beam-space BFWs. Performing the beam selection includes selecting a subset of the beam-space channel estimates and/or selecting a subset of the beam-space BFWs.

According to other embodiments, a method of operating a first network entity of a communications network is provided. The method includes receiving sounding reference signal ("SRS") in-phase and quadrature ("IQ") data from a second network entity operating in the communications network. The method further includes performing an antenna-space to beam-space transformation on the SRS IQ data to generate beam-space SRS IQ data. The method further includes determining beam-space channel estimates between the second network entity and a communication device in the communications network based on the beam-space SRS IQ data. The method further includes storing the beam-space channel estimates in a local memory. The method further includes determining scheduling information associated with downlink data to be transmit to the communication device based on the beam-space channel estimates. The method further includes determining beam-space beamforming weights ("BFWs") based on the beam-space channel estimates and the scheduling information. The method further includes performing beam selection on at least one of: the beam-space channel estimates and the beam-space BFWs. Performing the beam selection includes selecting a subset of the beam-space channel estimates and/or selecting a subset of the beam-space BFWs.

According to other embodiments, a network entity (e.g., a O-RAN distributed unit ("O-DU"), an O-RAN radio unit ("O-RU"), or a RAN node), a computer program, computer program product, or non-transitory computer readable medium is provided to perform one of the above methods.

Certain embodiments may provide one or more of the following technical advantages. In some embodiments, different beam-space transformation variants can be used by both O-DU and O-RU to conduct beamspace compression of BFWs, which are optimized for different antenna array configuration. The configuration chosen can better match the transformation to the antenna array configuration, thereby improve beamforming performance and/or increasing compression. The transformation complexity can be also reduced in some cases. In some examples, this can be advantageous in a multi-vendor environment when the O-DU and O-RU are from different vendors.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 7 is a table illustrating an example of pairing information between antenna configurations and their corresponding transform matrices according to some embodiments of inventive concepts;

FIG. 8 is a table illustrating an example of a list of transformation matrices according to some embodiments of inventive concepts;

DETAILED DESCRIPTION

Figure 1:
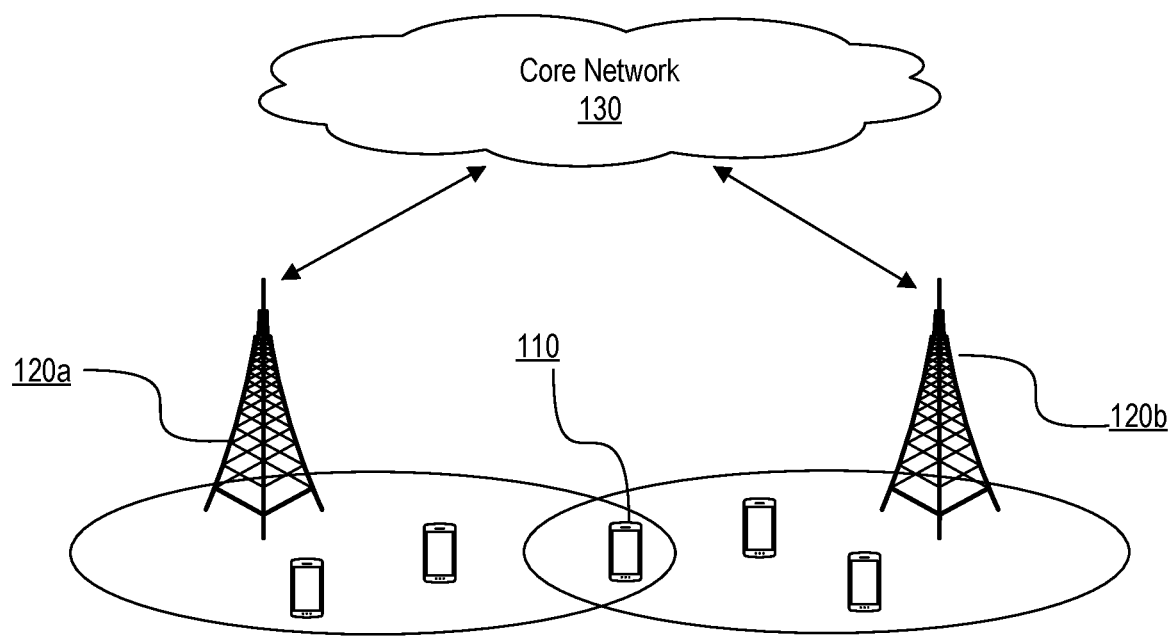
FIG. 1 is a schematic diagram illustrating an example of a $5^{th}$ generation ("5G") network.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Herein the term user layer can refer to an independent downlink ("DL") or uplink ("UL") data stream intended for one user. One user or communication devices (also referred to herein as a user equipment ("UE")) may have one or multiple user layers. Massive MIMO can also be referred to as massive beamforming, which is able to form narrow beams focusing on different directions to counteract against the increased path loss at higher frequency bands. It also benefits multi-user MIMO which allows for transmissions from/to multiple users simultaneously over separate spatial channels resolved by the massive MIMO technologies, while keeping high capacity for each user. Therefore, it can significantly increase the spectrum efficiency and cell capacity.

At the base-station side, the interface between the baseband unit ("BBU") and the radio unit ("RU") is the fronthaul interface, whereas the interface between the BBU and the core network ("CN") is the backhaul interface. The great benefits of massive MIMO at the air-interface also introduce new challenges at the base-station side. The legacy common public radio interface ("CPRI")-type fronthaul transports time-domain quadrature ("IQ") samples per antenna branch. As the number of antennas scales up in massive MIMO systems, the required fronthaul capacity also increases proportionally, which significantly drives up the fronthaul costs. To address this challenge, the fronthaul interface evolves from CPRI to enhanced CPRI ("eCPRI"), a packet-based fronthaul interface. In eCPRI, other functional split options between a BBU and a RU are supported, referred to as different lower-layer split ("LLS") options. The basic idea is to move the frequency-domain beamforming function from BBU to RU so that frequency samples or data of user-layers are transported over the fronthaul interface. Note that the frequency-domain beamforming is sometimes also referred to as precoding in the DL direction and equalizing or pre-equalizing in UL direction. By doing this, the required fronthaul capacity and thereby the fronthaul costs can be significantly reduced, as the number of user layers is typically much fewer than the number of antennas in massive MIMO.

The term radio unit ("RU") can be used herein to refer to a network node (or a portion of a network node) that performs radio functions including a portion of physical layer ("PHY") functions according to an LLS option. The RU can perform conversions between radio frequency ("RF") signals and baseband signals. On the network side a RU can transmit and receive the frequency-domain IQ data (modulated user data) or unmodulated user data to and from BBU through a fronthaul interface (e.g. eCPRI). The RU can also transmit and receive the RF signals to and from UEs through its antennas.

The term baseband unit ("BBU") can be used herein to refer to a network entity (e.g., a network node or a portion of a network node) that performs baseband processing. The BBU can communicatively couple to the CN via a backhaul interface or to a central unit ("CU") via an F1 interface.

In an open radio access network ("O-RAN") the BBU and RU can be referred to as O-DU and O-RU, respectively. In D-MIMO terminology, the RU can also be referred to as an access point ("AP") and the BBU can be referred to as a central processing unit ("CPU") or edge cloud processor. In some terminologies, the RU can also be referred to as remote radio unit ("RRU") and the BBU can be referred to as a digital unit or distributed unit ("DU"). In eCPRI terminologies, the BBU and the RU are referred to as an eCPRI radio equipment control ("eREC") and eCPRI radio equipment ("eRE") respectively. In another terminology, a BBU and a RU may be referred to as a LLS-CU and a LLS-DU respectively. The BBU and its equivalence can also be softwarized or virtualized as Baseband Processing Function in a Cloud environment. Use of the terms BBU and RU herein are not intended to limit the application of the innovation, which can be used in any suitable wireless field.

The term desired cell/channel can be used herein to refer to the cell/channel which connects to the UEs of the K user-layers.

The term user-plane data can be used herein to mean, for example, frequency-domain user-layer data sent over fronthaul.

The term channel information can be used herein to mean, for example, information about channel properties carried by the channel values. The term channel value/data can also be used here to refer to, for example, one or a set of complex values representing the amplitude and phase of the channel coefficients in frequency domain. The channel values are related to the frequency response of the wireless channel.

The term beam can be used herein to refer to a directional beam formed by multiplying a signal with different weights, in frequency-domain, at multiple antennas such that the energy of the wanted signal is concentrated to a certain direction and/or the energy of the interreference signal is nulled at a certain direction.

Figure 2:
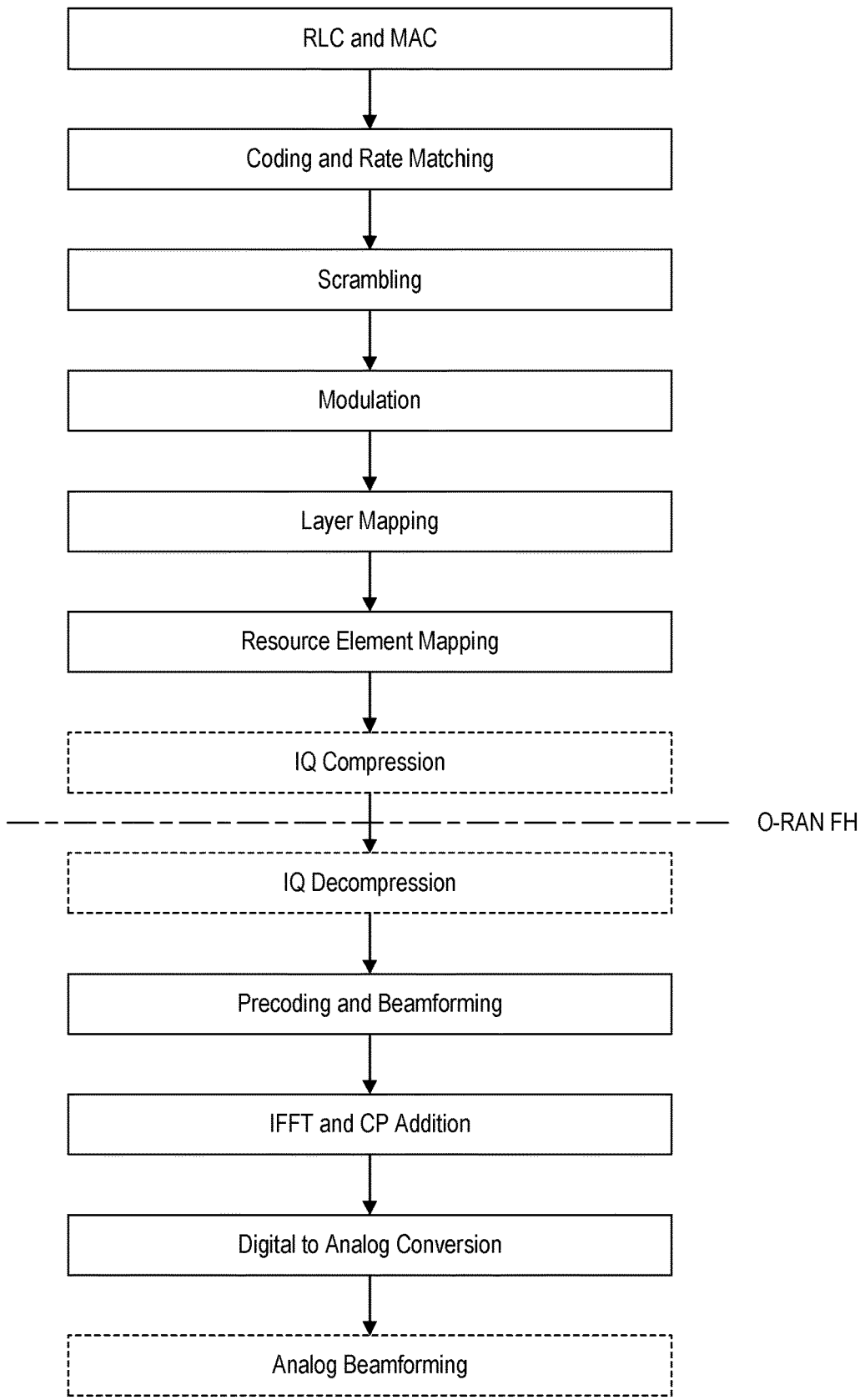
FIG. 2 is a flow chart illustrating an example of O-RAN lower layer split of category B radio in a downlink direction.

As an example, FIG. 2 shows the block diagram of an O-RAN LLS option in the DL direction for Cat-B radio. The PHY functional blocks above O-RAN FH is hosted by an O-DU, whereas the PHY functional blocks below O-RAN FH is hosted by an O-RU. In O-RAN, the frequency-domain beamforming is referred to as "precoding and beamforming" as shown in FIG. 2, which may be referred to herein as frequency-domain beamforming or beamforming.

The term beamforming can be used herein to refer to a technique which multiplies a signal with different weights (in frequency-domain) at multiple antennas, which enables the signal energy to be sent in space with a desired beam pattern by forming a directional beam concentrating on certain direction or forming nulling in certain direction, or a combination of both.

The term beamforming weight ("BFW") can be used herein to refer to a set of one or more complex weights, each set is multiplied with a signal of one user-layer at a subcarrier or a group of subcarriers. The weighted signals of different user layers towards the same antenna or transmit beam are combined linearly. As a result, different user-layer signals are beamformed to different directions. The wording beamforming performance when used herein may mean signal quality in DL at the UE side after the beamforming has been performed at the base-station side, measured by, for example, post-processing signal-to-interference-and-noise-power ratio ("SINR") at a UE, resulted user throughput, bit rate, etc.

The term antenna array can be used herein to refer to a set of multiple antennas which are used collectively to transmit and/or receive signal. In some examples, an antenna array is one antenna panel on which multiple antennas are placed. In additional examples, among these multiple antennas, more than one antennas are connected together and used as one antenna, which is connected to one radio frequency ("RF") component (e.g., a power amplifier or a low-noise amplifier). These connected antennas can be referred to as a subarray. From a baseband processing perspective, one subarray can act as one antenna. In this example, an antenna array is composed of multiple subarrays, each of which is composed of multiple antennas. In general, the size of a subarray is 1 when each subarray is composed of only one antenna. In some other terminologies, antennas in an antenna array are referred to as antenna elements. In O-RAN terminology, subarray can be referred to as array element and an antenna array can be referred to as an antenna. In O-RAN terminology, each antenna can include multiple array elements.

The term antenna ports can be used herein to refer to subarrays of an antenna array. When a subarray size is 1, each antenna port can correspond to each antenna. In O-RAN terminology, an antenna port can refer to an array element. In some examples, an antenna port is also referred to as a digital antenna port, where each digital antenna port corresponds to one antenna seen from baseband processing. In downlink, the output signals of beamforming in the frequency domain can be sent to the corresponding antenna ports.

There currently exist certain challenges. In O-RAN, only one-dimensional ("1 D") discrete Fourier transform ("DFT") is used for the optional beamspace compression of BFWs, which are sent from O-DU to O-RU for DL beamforming. However, 1D DFT only works well for a uniform linear antenna array. It does not work well for a rectangular planar antenna array which is usually used for O-RUs supporting massive MIMO. Use of a mismatched beamspace transformation may cause energy leakage in neighboring beams, thereby increase compression loss, and degrade performance.

Certain aspects of the disclosure and their embodiments may provide solutions to these or other challenges. Various embodiments described herein enable configuring beamspace compression of BFWs with different transformation variants (e.g., 1D DFT, two-dimensional ("2D") DFT, or three-dimensional ("3D") DFT), optimized for different antenna array configurations. In some embodiments, to make use of the beam-space property for compression at O-DU while still applying antenna-space BFWs at O-RU, O-DU and O-RU apply paired beam-space transformation and inverse transformation.

In additional or alternative embodiments, O-DU and O-RU individually determine the transformation variant to be used based on the antenna array parameters (e.g., the number of polarizations, the number of antenna ports in a vertical direction (sometimes referred to herein as vertical antenna ports), and the number of antenna ports in a horizontal direction (sometimes referred to herein as horizontal antenna ports)). In O-RAN terminology, the number of the vertical antenna ports is referred to as the number of rows of array elements and the number of the horizontal antenna ports is referred to as the number of columns of array elements.

In additional or alternative embodiments, O-DU sends the applied transformation or inverse transformation coefficients to O-RU.

In additional or alternative embodiments, different transformation variants are defined in a management plane ("M-plane"), and an indicator is sent from O-DU to O-RU to inform which transformation is applied by the O-DU.

In some embodiments, the beamspace compression is configured based on the antenna array configuration. In some examples, O-RU reports via M-plane the antenna array configuration regarding the number of polarizations P, the number of vertical antenna port M and the number of horizontal antenna port N. Then both O-DU and O-RU knows these parameters. The transformation matrix to be used is determined according to these parameters by O-DU and O-RU individually. For example, the transformation matrix can be determined as $F=I_P \otimes D_N \otimes D_M$ or $F=D_P \otimes D_N \otimes D_M$. Or such agreed relation between antenna configuration and transformation methods is specified in a table.

In additional or alternative examples, the O-DU sends the coefficients in matrix F or matrix $F^H$ to the O-RU via M-plane and/or control plane ("C-plane"). The O-RU then uses the coefficients (or the Hermitian transposed version) to transform BFWs back to antenna domain.

In additional or alternative examples, the list of supported transformation variants is defined in M-plane (e.g., Management-plane in O-RAN) as illustrated for example, in FIG. 8. Both O-DU and O-RU have the list defined in M-plane. An indicator is sent from O-DU to O-RU informing which variant is applied at the DU (e.g., by sending the transformation index, or by writing it into a configuration file).

In additional or alternative embodiments, beam reduction for beamspace compression is made on channel estimates instead of on beam weights, which improves performance and reduces computational complexity.

In additional or alternative embodiments, messaging between the O-DU and O-RU can be performed via M-plane signaling in a slow manner, or C-plane signaling in a fast manner. In some examples, a basic configuration can be set via M-plane, and then modified on-demand via M-plane or C-plane depending on the time scale (e.g., seconds or slots).

Certain embodiments may provide one or more of the following technical advantages. In some embodiments, different beam-space transformation variants can be used by both O-DU and O-RU to conduct beamspace compression of BFWs, which are optimized for different antenna array configuration. The configuration chosen can better match the transformation to the antenna array configuration, thereby improve beamforming performance and/or increasing compression. The transformation complexity can be also reduced in some cases. In some examples, this can be advantageous in a multi-vendor environment when the O-DU and O-RU are from different vendors.

Figure 3:
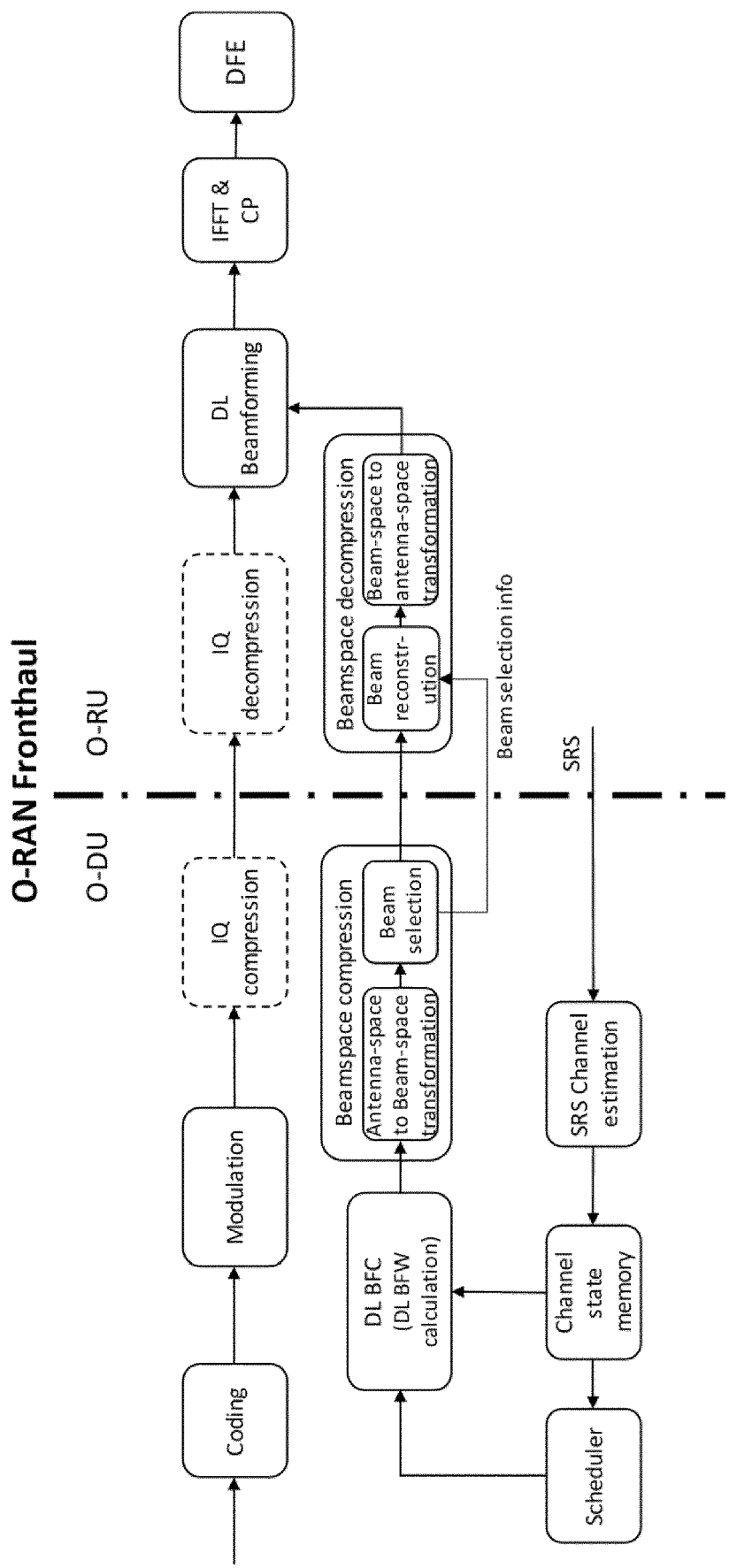
FIG. 3 is a block diagram illustrating an example of a downlink implementation of beamspace compression and decompression in O-DU and O-RU respectively, according to some embodiments of inventive concepts.

FIG. 3 illustrates a block diagram for downlink ("DL") beamforming implementation of an O-RAN O-DU and an O-RAN O-RU based on BFWs sent from O-DU to O-RU, using a standard (but optional) beamspace compression as specified in O-RAN WG4 CUS plane specification. The O-DU receives the sounding reference signal ("SRS") IQ data from O-RU and performs channel estimation. In some examples, the channel estimates in frequency domain are stored in a channel state memory. In additional or alternative examples, the channel estimates can be obtained from channel estimation based on an uplink ("UL") demodulation reference signal ("DMRS"). The scheduler uses the channel estimates from the channel state memory to determine which users on what resource elements to be served in DL in the next transmission time interval ("TTI") (e.g., a slot time of 0.5 ms). Then the scheduler will inform the DL beamforming control ("BFC") about the scheduling information. The DL BFC will read the channel estimates from the channel state memory according to the scheduling information and then calculate the BFWs based on the channel estimates of the scheduled users. The BFWs are compressed using a process referred to as beamspace compression before sending to the O-RU. In some examples, an indication of the compressed BFWs as well as an indication of the beam selection are transmitted to the O-RU to allow the O-RU to preform beamspace decompression.

In the current O-RAN specification, the BFWs used for each layer to all antenna ports are transformed from antenna-space to beam-space using 1 D-DFT (one dimensional discrete Fourier transform). For example, for an O-RU with 64 antenna ports, 64-point 1D-IDFT is used to transform the 64 antenna-space BFWs per layer to 64 beam-space BFWs. Then, only a subset of the beam-space BFWs per layer are selected and sent to O-RU via C-plane messages. An indication regarding which BFWs are selected is also sent via C-plane messages. In O-RAN, this indication is denoted as activeBeamspaceCoefficientMask. In this way, the number of BFWs sent over fronthaul is reduced due to beam selection and thereby the fronthaul load for transporting BFWs are reduced. In this sense, the beam-space BFWs are compressed. The O-RU receives the compressed beam-space BFWs and the indication regarding selected BFWs. Then, the O-RU reconstructs the BFWs by filling zeros to the unselected BFW positions accordingly. The reconstructed beam-space BFWs are transformed back to the antenna-space BFWs using 1 D-DFT (one dimensional inverse digital Fourier transform). The antenna-space BFWs are used to perform beamforming on the IQ data received from O-DU via U-plane messages. Then the beamformed IQ data in frequency domain are transformed to OFDM symbols by inverse fast Fourier transform ("IFFT") and adding cyclic prefix.

Figure 4:
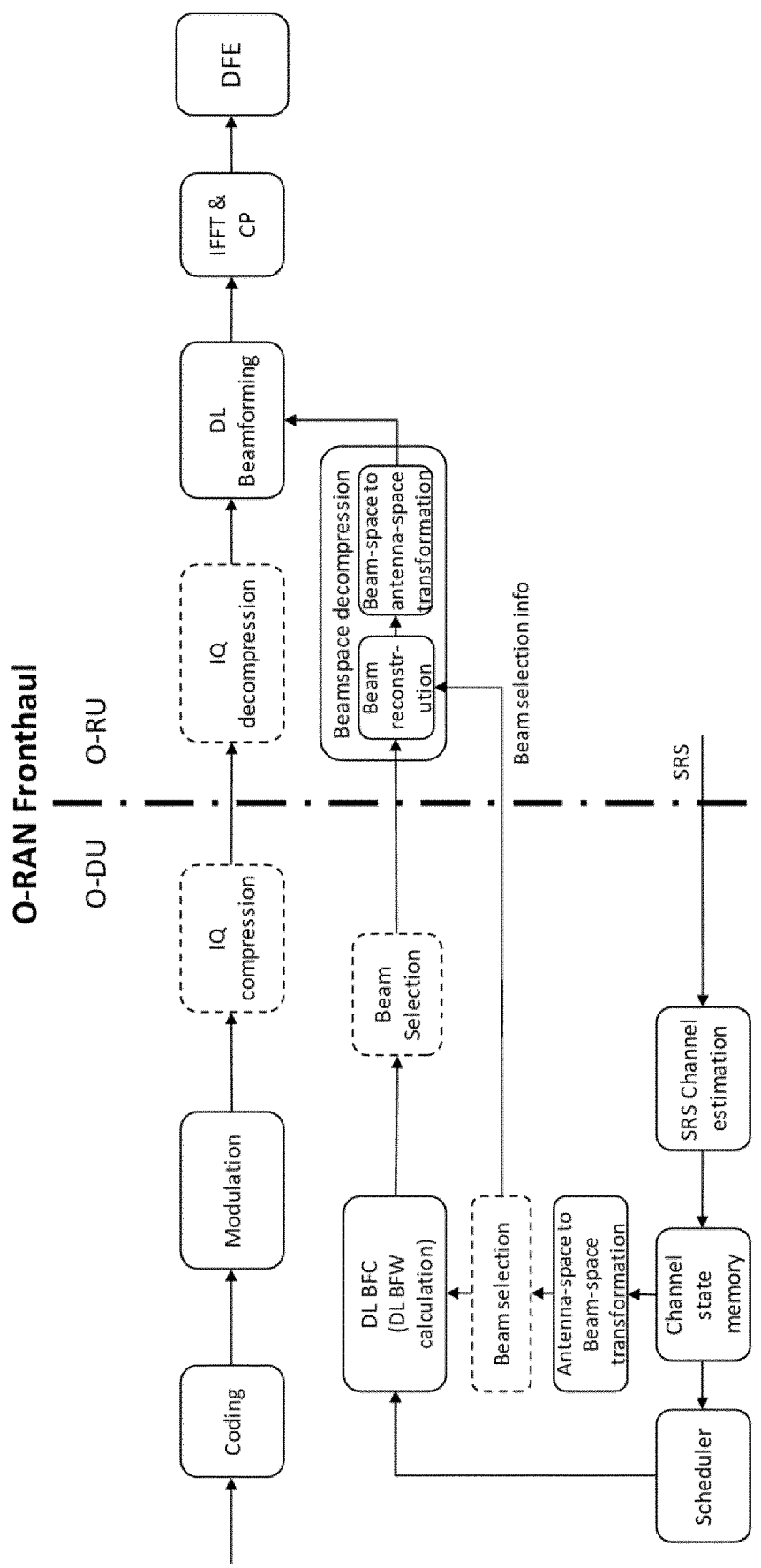
FIG. 4 is a block diagram illustrating an example of a downlink implementation of beamspace compression in O-DU and decompression in O-RU according to some embodiments of inventive concepts.

FIG. 4 shows an alternative implementation of beamspace compression in O-DU, which is not mentioned in the O-RAN specification. The same standard beamspace decompression as described in association with FIG. 3 can be used with full compatibility. In this implementation, instead of performing antenna-space to beam-space transformation on BFWs, it is done on the antenna-domain channel estimates. Then beam selection can be done either on the beam-space channel estimates or on the beam-space BFWs calculated based on the beam-space channel estimates, or on both. One benefit of doing beam selection on the beam-space channel estimates is that it can reduce the computational complexity of calculating BFWs in BFC due to the reduced number of beam-space channel estimates after beam selection. Another benefit is that it may also improve beamforming performance comparing to the previous method, especially when a smaller number of beams are selected. In some examples, an indication of the beam selection is transmitted to the O-RU prior to calculating the BFWs. In other examples, the indication of the beam selection is transmitted to the O-RU after calculating the BFWs.

Figure 5:
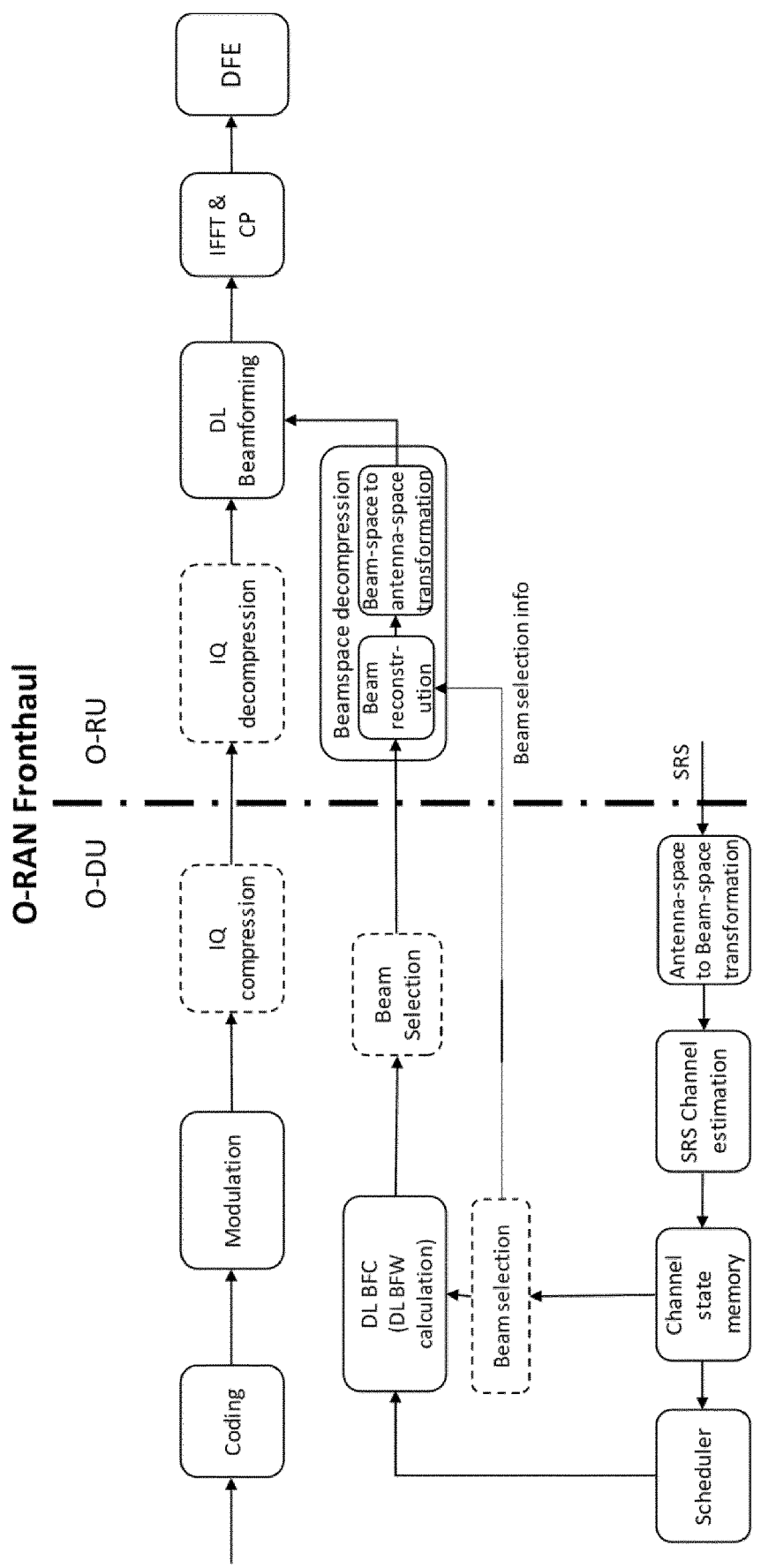
FIG. 5 is a block diagram illustrating another example of a downlink implementation of beamspace compression in O-DU and decompression in O-RU according to some embodiments of inventive concepts.

FIG. 5 shows another alternative implementation of beamspace compression in O-DU, which is not mentioned in the O-RAN specification. The same standard beamspace decompression as described in association with FIG. 2 can be used with full compatibility. In this implementation, the antenna-space to beam-space transformation is done on the received SRS IQ data. Therefore, the SRS-based channel estimation is done in beam space. The benefit is that the SNR of the strong beams are improved due to the fact that the beam-space channel tends to concentrate, i.e. having more energy, around a few directions. The improved SNR improves the channel estimation quality and thereby improve beamforming performance. In some examples, an indication of the beam selection is transmitted to the O-RU prior to calculating the BFWs. In other examples, the indication of the beam selection is transmitted to the O-RU after calculating the BFWs.

In some examples, BFWs are quantized before sending to O-RU. In the current O-RAN specification, a quantization based on block scaling is used. The selected beam-space BFWs are first scaled (normalized) by the largest absolute value of all real and imaginary parts. Then the normalized BFWs are quantized in fixed-point format with a certain number of bits. The quantized BFWs together with the scaling factor used are sent via C-plane messages to O-RU. Accordingly, O-RU will dequantize the received BFWs with the received scaling factor before beam reconstruction. Without loss of the validity and generality, the quantization and dequantization modules are not shown in FIGS. 3-5.

As described above, the current O-RAN specification uses 1 D-DFT on all antenna ports to perform the antenna-space to beam-space transformation for beamspace compression and correspondingly uses 1D-IDFT to perform the beamspace to antenna-space transformation in beamspace decompression. However, 1D-DFT is not optimal in many cases with different type of antenna array configurations. O-RU supporting massive MIMO usually has a rectangular planar antenna array with M×N antenna ports (an antenna port can be a single antenna element or a subarray comprising multiple antenna elements. Therefore, it sometimes is referred to herein as elements or subarrays) including M×N antenna ports, where M denotes the number of antenna ports in vertical direction (also referred to as the number of rows of the array) and N denotes the number of antenna ports in horizontal direction (also referred to as the number of columns of the array). A subarray includes one or more antenna ports sharing the same power amplifier ("PA") and digital front-end ("DFE"). In addition, the antenna array may include dual-polarized or single-polarized antenna ports. A dual-polarized antenna array effectively includes one M×N antenna array of one polarization and another M×N antenna array of the other polarization. In some examples, for a single-polarized rectangular planar antenna array, using 2D-DFT for the antenna-space to beam-space transformation performs better than the 1D-DFT procedure used in the current O-RAN specification. For a dual-polarized rectangular planar antenna array, it is better to perform 2D-DFT separately on two polarizations, respectively. For a single-polarized uniform linear array, it is good to use the current 1D-DFT procedure used in the current O-RAN specification. For a dual-polarized uniform linear array, it is better to perform 1D-DFT separately on two polarizations, respectively.

Figure 6:
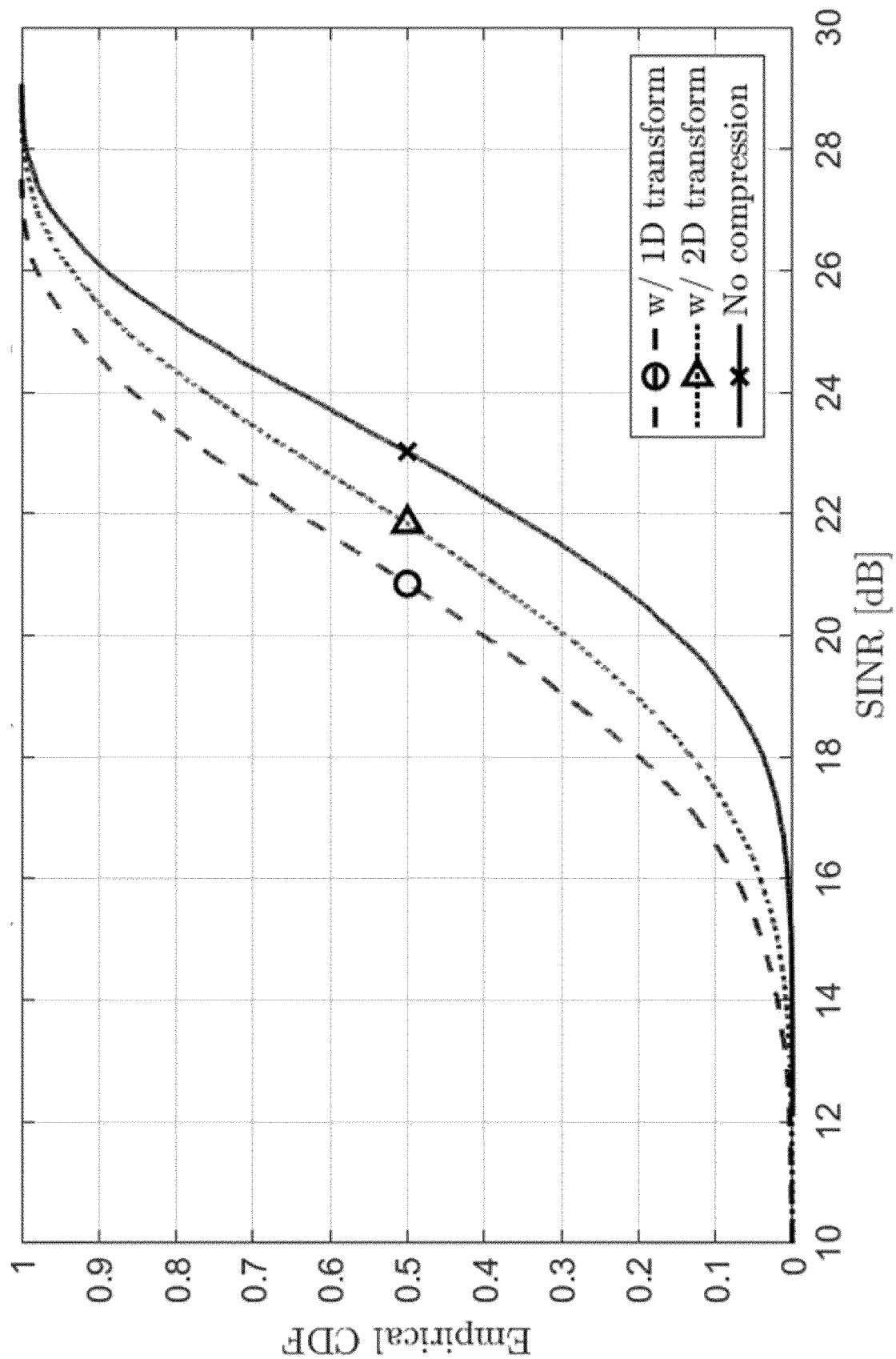
FIG. 6 is a graph illustrating an example of simulation results comparing beamforming performances with different beamspace transform variants according to some embodiments of inventive concepts.

FIG. 6 illustrates some simulation results of an example that performing 2D-DFT separately on both polarizations achieve 1 dB better SNR than that using the current 1D-DFT procedure when 16 beams are selected out of 64 beams for a dual-polarized 4×8 planar antenna array. In this case, 4 times compression is achieved with the performance close to that without compression.

In some embodiments, to achieve the best performance of beamspace compression with different types of antenna array configurations, the O-DU chooses an antenna-space to beam-space transformation variant based on the antenna array configuration of O-RU and inform the O-RU of the chosen procedure or the used transformation coefficients via M-plane messages.

Embodiments of beamspace transformation variants are described below. Let F denote a transformation matrix, which is used to perform antenna-space to beam-space transformation. The transformation matrix F is usually a unitary matrix. As described before, in O-DU, the antenna-space to beam-space transformation can be done on BFWs, channel estimates or SRS IQ data.

For BFWs, in frequency domain, the antenna-space BFWs per layer denoted as a BFW vector $w_a$ are calculated first according to the antenna-space channel estimates. Then, the antenna-space BFWs per layer $w_a$ is transformed to the beam-space BFWs per layer $w_b$ by $w_b=F^H w_a$, where $F^H$ denotes the Hermitian transpose of F which also corresponds to the inverse transformation matrix against the transformation matrix F. The beam selection is done on the beam-space BFWs $w_b$.

For channel estimates, in frequency domain, the antenna-space channel is first estimated. The antenna-space channel estimate per layer is denoted as a channel vector $h_a$. Then, the antenna-space channel estimate per layer $h_a$ is transformed to the beam-space channel estimate per layer $h_b$ by $h_b=F^T h_a$, where $F^T$ denotes the transpose of F. The beam selection can be done either on the beam-space channel estimate vectors and/or on the beam-space BFW vectors $w_b$ which is calculated based on the beam-space channel estimate vectors.

For SRS IQ data, in frequency domain, the received antenna-space SRS IQ data are denoted an SRS vector $s_a$. The antenna-space SRS vector is transformed to the beam-space SRS vector $s_b$ by $s_b=F^H s_a$. The beam-space SRS vectors are used for channel estimation in beam-space, which obtains the beam-space channel estimates. The beam selection can be done either on the beam-space channel vectors and/or on the beam-space BFW vectors $w_b$ which is calculated based on the beam-space channel estimate vectors.

After any of above beamspace compression implementation, the compressed BFW vector per layer is denoted as $\hat{w}_b$, which has fewer elements than $w_b$ if beam selection is done. The O-RU receives the compressed BFWs. It fills the zeros to the unselected beam-space BFWs positions in each BFW vector per layer $\hat{w}_b$ to reconstruct the beam-space BFW vector as $\tilde{w}_b$. Then, the reconstructed beam-space BFW vector $\tilde{w}_b$ is transformed back to the reconstructed antenna-space BFW vector $\tilde{w}_a$ by $\tilde{w}_a=F\tilde{w}_b$.

DFT (discrete Fourier transform) is often used for the transformation. In the following, DFT is used as an example. But the transformation can be based on other types of transformation, e.g. SVD (singular value decomposition). Let $D_L$ denote an L-point DFT matrix, where the entry on the m-th row and n-th column of $D_L$ is expressed as $$D_L(m,n) = \frac{1}{\sqrt{L}} e^{-2\pi i(m-1)(n-1)/L}$$

Let K denote the total number of antenna ports. Different variants of $F \in C^{K \times K}$ can be composed as one of the following options.

Option 1: one full-size 1D-DFT over all antenna ports. In this case, 1D DFT is conducted over all K antenna ports, and the transformation matrix can be written as $$F = D_K$$

This transformation is used in the current O-RAN specification. This choice of F fits well to a single polarized linear antenna array.

Option 2: one half-size 1D-DFT per polarization. When a dual polarized antenna array is used, it is better to perform a half-size transformation per polarization. The transformation matrix can be written as $$F = I_2 \otimes D_{K/2}$$

where $I_2$ denotes a size-2 identity matrix and $\otimes$ denotes Kronecker product. This choice of F fits well to a dual-polarized linear antenna array.

Option 3: one full-size 2D-DFT over all antenna ports cross vertical and horizontal dimensions of a rectangular planar antenna array. For massive MIMO, O-RU often uses a rectangular planar antenna array with M×N antenna ports including K=M×N antenna ports, where M denotes the number of antenna ports in a vertical direction, N denotes the number of antenna ports in a horizontal direction. The number of the antenna ports in the vertical direction M represents the number of rows of a planar antenna array. The number of the antenna ports in the horizontal direction N represents the number of columns of a planar antenna array. If M or N is 0, the antenna array becomes a linear array.

Basically, the array has M rows of antenna ports and each row has N antenna ports. Therefore, the total number of antenna ports are K=MN. The transformation matrix can be written as $$F = D_N \otimes D_M$$

where $\otimes$ denotes Kronecker product. The transformation matrix is mathematically the transformation matrix of 2D-DFT (two-dimensional discrete Fourier transform) cross the vertical and horizontal dimensions of the antenna array. Note that the order of $D_N$ and $D_M$ in the Kronecker product, i.e. $D_N \otimes D_M$ or $D_M \otimes D_N$, only affects the order of the elements in the antenna-space vector which will be transformed to beam-space. The elements of the antenna-space vector should be ordered according to the order of $D_N$ and $D_M$ in the Kronecker product. This is also applicable to the rest of description of this document. This choice of $F=D_N \otimes D_M$ in Option 3 fits well to a single polarized rectangular planar antenna array.

Option 4: one half-size 2D-DFT per polarization cross vertical and horizontal dimensions of a rectangular planar antenna array. When a rectangular planar antenna array is dual polarized, each polarization has M antenna ports in the vertical direction and N antenna ports in the horizontal direction in a planar array. The total number of polarized antenna ports K=2MN. In this case, it is better to perform the transformation per polarization. The transformation matrix can be written as $$F = I_2 \otimes D_N \otimes D_M$$

where $I_2$ denotes a size-2 identity matrix and $\otimes$ denotes Kronecker product. As mentioned, this choice of F fits well to a dual-polarized rectangular planar antenna array.

Option 5: one full-size 3D-DFT over all antenna ports cross the vertical, horizontal and polarization dimensions of a dual-polarized rectangular planar antenna array. This option is an alternative to Option 4. In this option, the polarization is treated as the third dimension for transformation. The transformation matrix can be written as $$F = D_2 \otimes D_N \otimes D_M$$

where $\otimes$ denotes Kronecker product. The transformation matrix is mathematically the transformation matrix of 3D-DFT (three-dimensional discrete Fourier transform) cross the vertical, horizontal and polarization dimensions of the antenna array.

Option 6: one full-size 2D-DFT over all antenna ports cross antenna port and polarization dimensions of a dual-polarized antenna array. This option is an alternative to Option 2, which fits a dual-polarized linear antenna array. The transformation matrix can be written as $$F = D_2 \otimes D_{K/2}$$

where $\otimes$ denotes Kronecker product. This transformation matrix represents a 2D-DFT cross antenna port and polarization dimension.

Embodiments regarding configuration of the transformation variant are described below. In some embodiments, the coefficients in matrix F can be composed differently. DU and RU may coordinate on what transformation are used and accordingly apply the paired transformation and inverse transformation.

In some embodiments, O-RU reports via M-plane the antenna array configuration regarding the number of polarizations P, the number of vertical antenna port M and the number of horizontal antenna port N. Then both O-DU and O-RU knows these parameters. The transformation matrix to be used are determined according to these parameters by O-DU and O-RU individually. The transformation used in O-RU can be preconfigured since O-RU knows its own antenna configuration. In this case, only O-DU can determine what transformation to use after receiving O-RU's report regarding its antenna configuration. For example, the transformation matrix can be determined as $F=I_P \otimes D_N \otimes D_M$, which is generalized to support Option 1-4. It can also be determined as $F=D_P \otimes D_N \otimes D_M$, which is generalized to support Option 1, 3, 5, 6. Another example can be that O-DU and O-RU share a table, which lists the pairing information between antenna configurations and their corresponding transformation matrices to be used. FIG. 7 shows one example of the pairing-information table. Such a table can be specified in the fronthaul standard used, e.g. O-RAN fronthaul specification. O-RU can preconfigure its transformation according to its antenna configuration and the table. O-DU can select the transformation to be used according to the reported O-RU antenna configuration information.

One advantage of this implementation is that O-DU and O-RU can determine the transformation on their own based on the information of antenna configuration which both sides know. It doesn't need any signaling to coordinate the selection. However, to keep the backwards compatibility, it may need a new parameter in M-plane to enable this feature. O-RU may report that it supports this feature. And O-DU informs O-RU to use this feature.

In some examples, O-DU sends the coefficients in matrix F or matrix $F^H$ to the O-RU via M-plane or C-plane (control plane). O-RU then uses the coefficients (or the Hermitian transposed version) to transform BFWs back to antenna domain. In some transforms like DFT, F or matrix $F^H$ is a symmetric matrix. In this case, it is sufficient to send only the upper triangular matrix or the lower triangular matrix of the original matrix to O-RU. The upper triangular matrix is composed by all the entries above and including the main diagonal entries. The lower triangular matrix is composed by all the entries below and including the main diagonal entries. Then O-RU can reconstruct F or $F^H$ without any loss.

In additional or alternative examples, the transformation matrix F can be calculated as $F=I_P \otimes D_N \otimes D_M$ or $F=D_P \otimes D_N \otimes D_M$ where P denotes the number of polarizations, M denotes the vertical antenna port and N denotes the horizontal antenna port. O-DU can send $I_P$, $D_N$ and $D_M$ or $D_P$, $D_N$ and $D_M$ separately to O-RU. Then O-RU can calculate F or $F^H$. The number of coefficients to send $I_P$, $D_N$ and $D_M$ or $D_P$, $D_N$ and $D_M$ is smaller than to send F. So, it compresses the data of the signaling from O-DU to O-RU.

Overall, this implementation may be the most flexible way of coordinating the transformation between O-DU and O-RU. It doesn't need to specify in the fronthaul standard, e.g. in O-RU, how to configure different transformation options. O-DU fully controls what transformation to use and O-RU just uses the transformation matrix received for beamspace decompression.

In additional or alternative embodiments, a list of supported transformation variants is defined in M-plane, e.g., Management-plane in O-RAN specification. An example is shown in FIG. 8. In this example, an O-RU that does not support beamspace compression would only have transformation index 0 in its table. The O-DU will retrieve a list of supported transformation variants from the O-RU via the Management plane out of which one variant will be mandatory for O-RU to implement in order to support interoperability between vendors of DUs and RUs. The O-DU knows the supported variants from O-RU's report via M-plane signaling or messages. Then the O-DU sends an indicator to O-RU informing which variant is applied at the O-DU, e.g. by sending the transformation index. The O-RU then applies the indicated transformation for beamspace decompression.

In additional or alternative embodiments, the implementations described above may be defined as a new compression method for BFWs in O-RAN. In this case, the M-plane and C-plane support for configuring the new compression method follows the same way as how any of the existing compression methods is configured. The new compression method can be configured statically via M-plane. It can be also dynamically configured via C-plane.

In additional or alternative embodiments, the procedures described above can be used for initial system configuration (e.g., after startup or restart of O-RU and/or O-DU) to configure the transformation used in beamspace compression based on M-plane mechanisms (e.g., M-plane signaling or messages).

In additional or alternative embodiments, the procedures described above can also be used to change the transformation when the antenna configuration is changed. For example, to save energy consumption, O-RU can disable part of the antenna array by turning off the power amplifiers ("PAs") and digital front ends ("DFEs") of some antenna ports or putting them to an idle mode. In this case, the transformation used for beamspace compression can be changed according to the changed antenna array configuration. For example, if half of the array are to be turned off, the transformation size would reduce by half. Some embodiments can be used to update the transformation via M-plane signaling or messages in a slow manner or via C-plane signaling or messages in a fast manner.

In additional or alternative embodiments, some of the procedures described above can also support non-fixed transformation matrix (e.g., based on singular value decomposition, ("SVD"). Using SVD may achieve higher compression and better performance. Comparing to fixed transformation matrix (e.g., based on DFT), the transformation matrix of SVD can be calculated based on the BFWs or the channel estimates. In some examples, O-DU sends the calculated transformation matrix via C-plane signaling or messages in a fast manner, e.g. send for every slot. The amount of C-plane information from O-DU to O-RU can become quite large if non-fixed transforms are used frequently. However, such method can be used to reduce UL FH traffic at the expense of increased DL FH traffic, e.g., for a cell where UL traffic dominates. Frequency-domain compression can be used to mitigate this problem by reducing the amount of the data. For example, the same non-fixed transform can be shared with a group of subcarriers or PRBs (physical resource block).

Embodiments regarding an alternative implementation performing 2D-DFT are described below.

In the previous descriptions, the transformation is formulated as a matrix multiplication, i.e. $x_b = F x_a$, where a vector $x_a$ is transformed to vector $x_b$ by the transformation matrix F. For 2D-DFT considering one of the polarization(s), $F = D_N \otimes D_M$, where the first dimension has M elements, and the second dimension has N elements. If $x_a$ is shaped to an M×N matrix $X_a$, the transformation can be done as $X_b = D_M X_a D_N$. In this way, the number of mathematical operations (i.e. multiplications and additions) required are reduced significantly, which would use less computational resources than doing $x_b = F^H x_a$. If multiple polarizations are available, it is preferred to apply the method separately for each polarization. For a single polarization, the number of mathematical operations needed for a 2D-DFT with this embodiment is typically (M+N)/M/N times the original method (with the transformation matrix F). Thus, the method is beneficial for panels larger than 2×2 elements (or subarrays).

In the description that follows, while the first network entity may be any of the O-DU, network node 1210A, 1210B, 1400, 1704, hardware 1604, or virtual machine 1608A, 1608B, the network node 1400 shall be used to describe the functionality of the operations of the first network node. Operations of the network node 1400 (implemented using the structure of FIG. 14) will now be discussed with reference to the flow charts of FIGS. 9-11 according to some embodiments of inventive concepts. For example, modules may be stored in memory 1404 of FIG. 14, and these modules may provide instructions so that when the instructions of a module are executed by respective network node processing circuitry 1402, processing circuitry 1402 performs respective operations of the flow chart.

Figure 9:
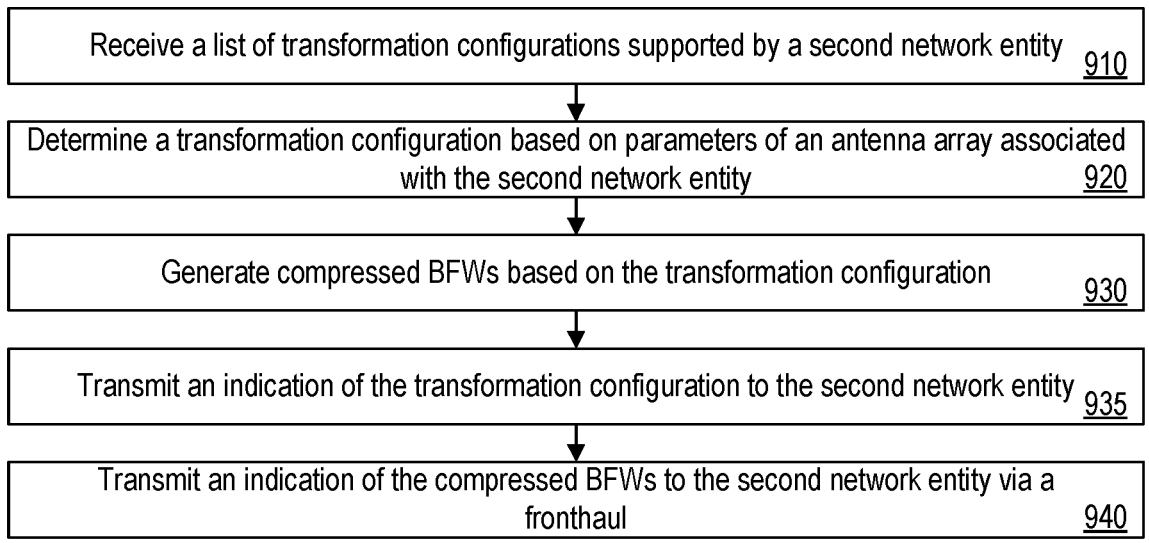
FIGS. 9-11 are flow charts illustrating examples of operations of a network entity according to some embodiments of inventive concepts.

FIG. 9 illustrates an example of operations performed by a first network entity of a communications network. In some embodiments, the communications network includes an O-RAN, the first network entity is an O-DU, and the second network entity is an O-RU.

At block 910, processing circuitry 1402 receives, via communication interface 1406, a list of transformation configurations supported by a second network entity.

At block 920, processing circuitry 1402 determines a transformation configuration based on parameters of an antenna array associated with the second network entity. In some embodiments, the parameters of the antenna array include at least one of: a number of polarizations, a number of antenna ports in a vertical direction, and a number of antenna ports in a horizontal direction. In some examples, the number of antenna ports in the vertical direction represents the number of rows of a planar antenna array and the number of antenna ports in the horizontal direction represents the number of columns of the planar antenna array. If either number of antenna ports in the vertical direction or the number of antenna ports in the horizontal direction are zero the antenna array can be a linear antenna array.

In additional or alternative embodiments, determining the transformation configuration includes determining the transform configuration based on the parameters of an antenna array and the list of transformation configurations (from block 910).

At block 930, processing circuitry 1402 generates compressed BFWs based on the transformation configuration.

In some embodiments, the antenna array includes a single polarized antenna array and generating the compressed BFWs includes performing an antenna-space to beam-space transformation using one full-size one-dimensional transform over all antenna ports.

In additional or alternative embodiments, the antenna array includes a dual polarized antenna array and generating the compressed BFWs includes performing an antenna-space to beam-space transformation using one half-size one-dimensional transform per polarization.

In additional or alternative embodiments, the antenna array includes a rectangular planar antenna array with M antenna ports in the vertical direction and N antenna ports in the horizontal direction and generating the compressed BFWs comprises performing an antenna-space to beam-space transformation using one full-size two-dimensional transform over all antenna ports cross vertical and horizontal dimensions of the rectangular planar antenna array.

In additional or alternative embodiments, the antenna array includes a dual polarized rectangular planar antenna array with M antenna ports in the vertical direction and N antenna ports in the horizontal direction, and generating the compressed BFWs includes performing an antenna-space to beam-space transformation using one half-size two-dimensional transform per polarization cross vertical and horizontal dimensions of the dual polarized rectangular planar antenna array.

In additional or alternative embodiments, the antenna array includes a dual polarized rectangular planar antenna array with M antenna ports in the vertical direction and N antenna ports in the horizontal direction and generating the compressed BFWs includes performing an antenna-space to beam-space transformation using one full-size three-dimensional transform over all antenna ports cross vertical and horizontal dimensions of the dual polarized rectangular planar antenna array.

In additional or alternative embodiments, the antenna array includes a dual polarized antenna array, and generating the compressed BFWs includes performing an antenna-space to beam-space transformation using one full-size two-dimensional transform over all antenna ports cross antenna port and polarization dimensions of the dual polarized rectangular planar antenna array.

In additional or alternative embodiments, generating the compressed BFWs includes performing an antenna-space to beam-space transformation using at least one of a discrete Fourier transform, DFT, and a singular value decomposition, SVD.

In additional or alternative embodiments, generating the compressed BFWs comprises includes: performing antenna-space to beam-space transformation on the BFWs to generate beam-space BFWs and performing beam selection on the beam-space BFWs by selecting a subset of the beam-space BFWs.

At block 935, processing circuitry 1402 transmits, via communication interface 1406, an indication of the transformation configuration to the second network entity. In some embodiments, the indication is transmitted via at least one of: a management plane and a control plane.

In additional or alternative embodiments, the transformation configuration includes a transformation matrix, and transmitting the indication of the transformation configuration includes transmitting an indication of an upper or a lower triangle of the transformation matrix to the second network entity.

In additional or alternative embodiments, transmitting the indication of the transformation configuration includes transmitting an indication of an index in the list of transformation configurations (from block 910).

At block 940, processing circuitry 1402 transmits, via communication interface 1406, an indication of the compressed BFWs to the second network entity via a fronthaul. The fronthaul can be an interface between the first network entity and the second network entity.

Various operations from the flow chart of FIG. 9 may be optional with respect to some embodiments of network entities and related methods. For example, operations of blocks 910 and 935 of FIG. 9 may be optional.

Figure 10:
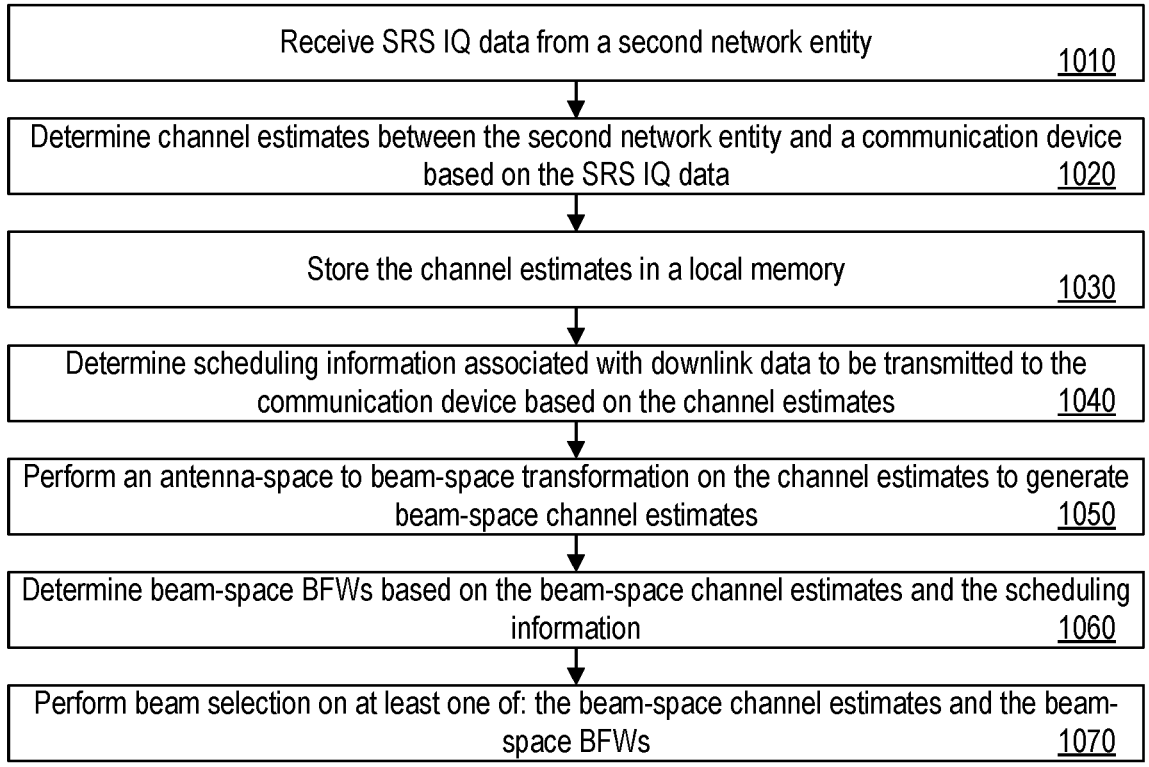

FIG. 10 illustrates another example of operations performed by a first network entity of a communications network. At block 1010, processing circuitry 1402 receives, via communication interface 1406, SRS IQ data from a second network entity. At block 1020, processing circuitry 1402 determines channel estimates between the second network entity and a communication device based on the SRS IQ data. At block 1030, processing circuitry 1402 stores the channel estimates in a local memory. At block 1040, processing circuitry 1402 determines scheduling information associated with downlink data to be transmitted to the communication device based on the channel estimates. At block 1050, processing circuitry 1402 performs an antenna-space to beam-space transformation on the channel estimates to generate beam-space channel estimates. At block 1060, processing circuitry 1402 determines beam-space BFWs based on the beam-space channel estimates and the scheduling information. At block 1070, processing circuitry 1402 performs beam selection on at least one of: the beam-space channel estimates and the beam-space BFWs. In some examples, performing the beam selection includes selecting a subset of the beam-space channel estimates and/or selecting a subset of the beam-space BFWs.

Various operations from the flow chart of FIG. 10 may be optional with respect to some embodiments of network entities and related methods. In some examples, the operations of FIG. 10 are performed in addition or alternatively to the operations of FIG. 9.

Figure 11:
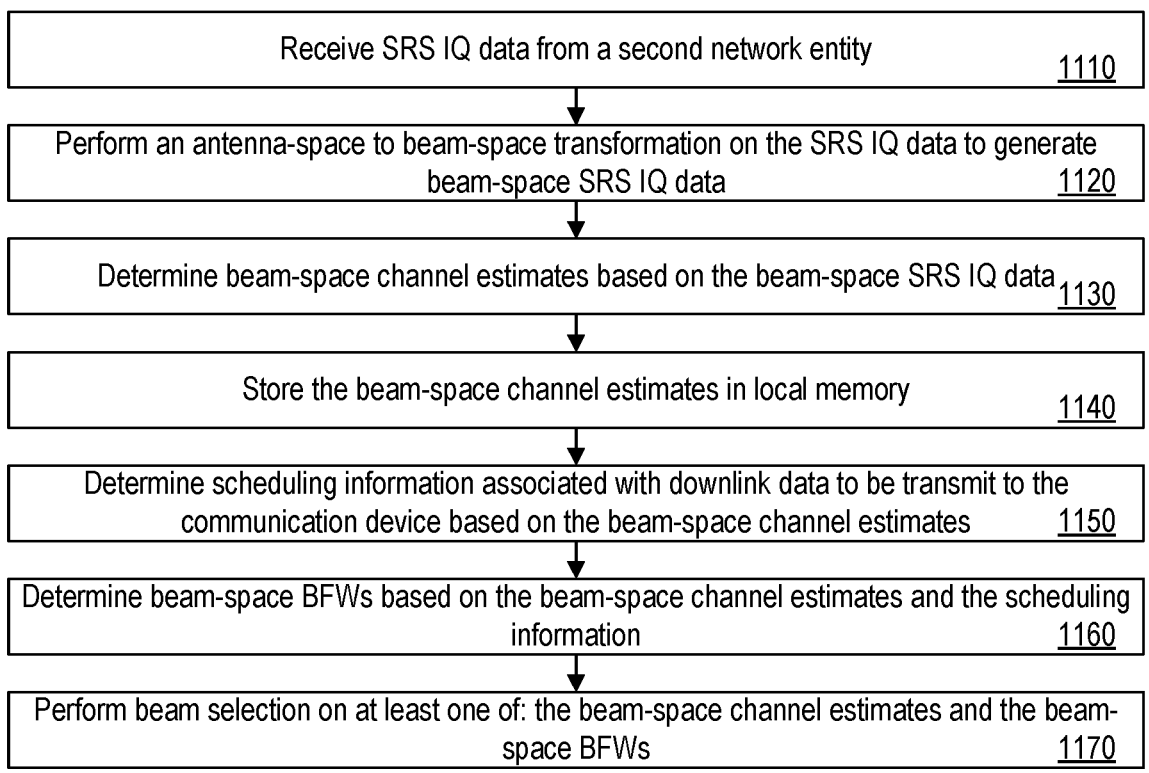

FIG. 11 illustrates another example of operations performed by a first network entity of a communications network. At block 1110, processing circuitry 1402 receives, via communication interface 1406, SRS IQ data from a second network entity. At block 1120, processing circuitry 1402 performs an antenna-space to beam-space transformation on the SRS IQ data to generate beam-space SRS IQ data. At block 1130, processing circuitry 1402 determines beam-space channel estimates based on the beam-space SRS IQ data. At block 1140, processing circuitry 1402 stores the beam-space channel estimates in local memory. At block 1150, processing circuitry 1402 determines scheduling information associated with downlink data to be transmitted to the communication device based on the beam-space channel estimates. At block 1160, processing circuitry 1402 determines beam-space BFWs based on the beam-space channel estimates and the scheduling information. At block 1170, processing circuitry 1402 performs beam selection on at least one of: the beam-space channel estimates and the beam-space BFWs. In some examples, performing the beam selection includes selecting a subset of the beam-space channel estimates and/or selecting a subset of the beam-space BFWs.

Various operations from the flow chart of FIG. 11 may be optional with respect to some embodiments of network entities and related methods. In some examples, the operations of FIG. 11 are performed in addition or alternatively to the operations of FIG. 9.

Figure 12:
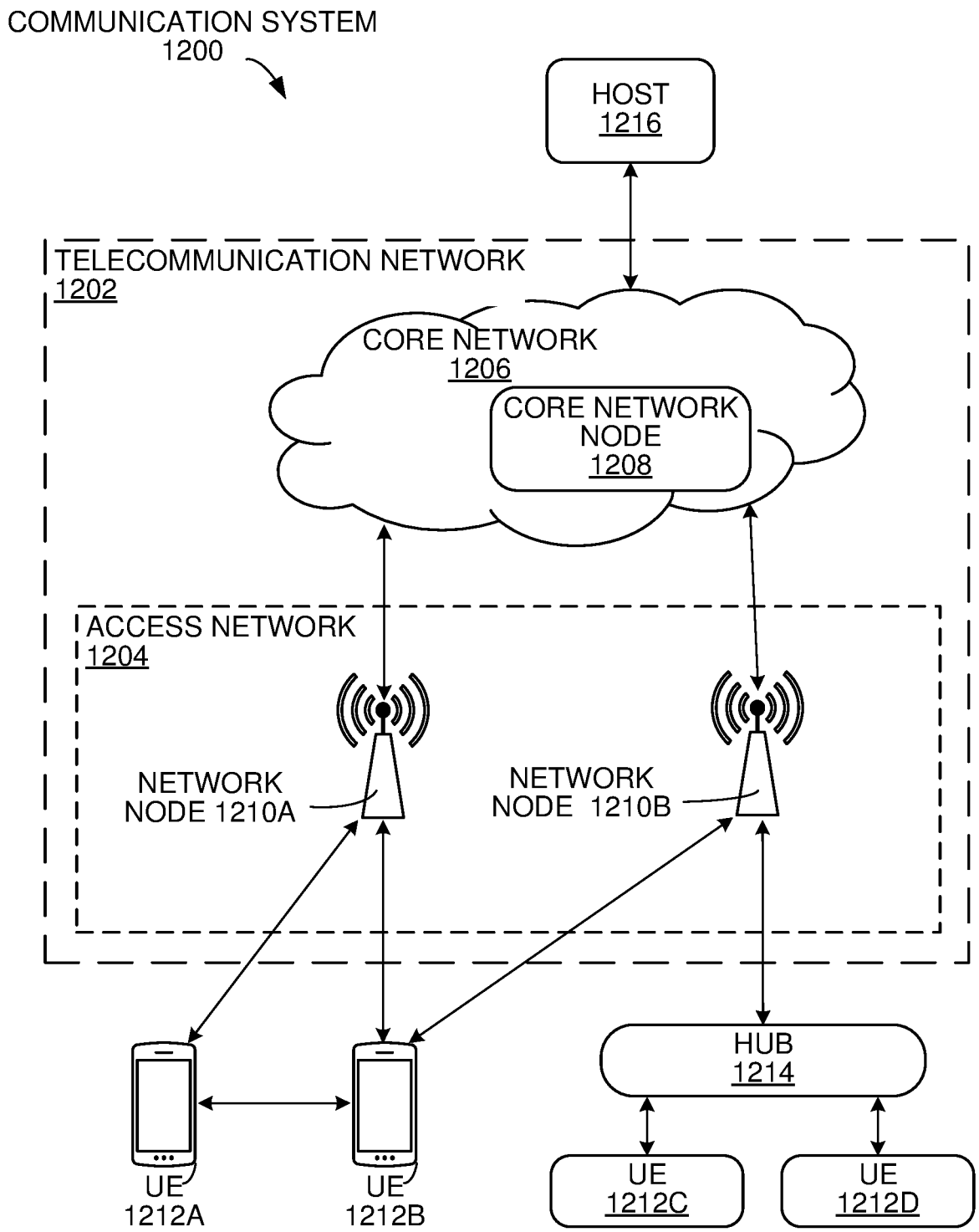
FIG. 12 is a block diagram of a communication system in accordance with some embodiments.

FIG. 12 shows an example of a communication system 1200 in accordance with some embodiments.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210a and 1210b (one or more of which may be generally referred to as network nodes 1210), or any other similar 3$^{rd}$ Generation Partnership Project (3GPP) access node or non-3GPP access point. The network nodes 1210 facilitate direct or indirect connection of user equipment (UE), such as by connecting UEs 1212a, 1212b, 1212c, and 1212d (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212c and/or 1212d) and network nodes (e.g., network node 1210b). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210b. The hub 1214 may also allow for a different communication scheme and/or schedule between the hub 1214 and UEs (e.g., UE 1212c and/or 1212d), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210b. In other embodiments, the hub 1214 may be a non-dedicated hub—that is, a device which is capable of operating to route communications between the UEs and network node 1210b, but which is additionally capable of operating as a communication start and/or end point for certain data channels.

Figure 13:
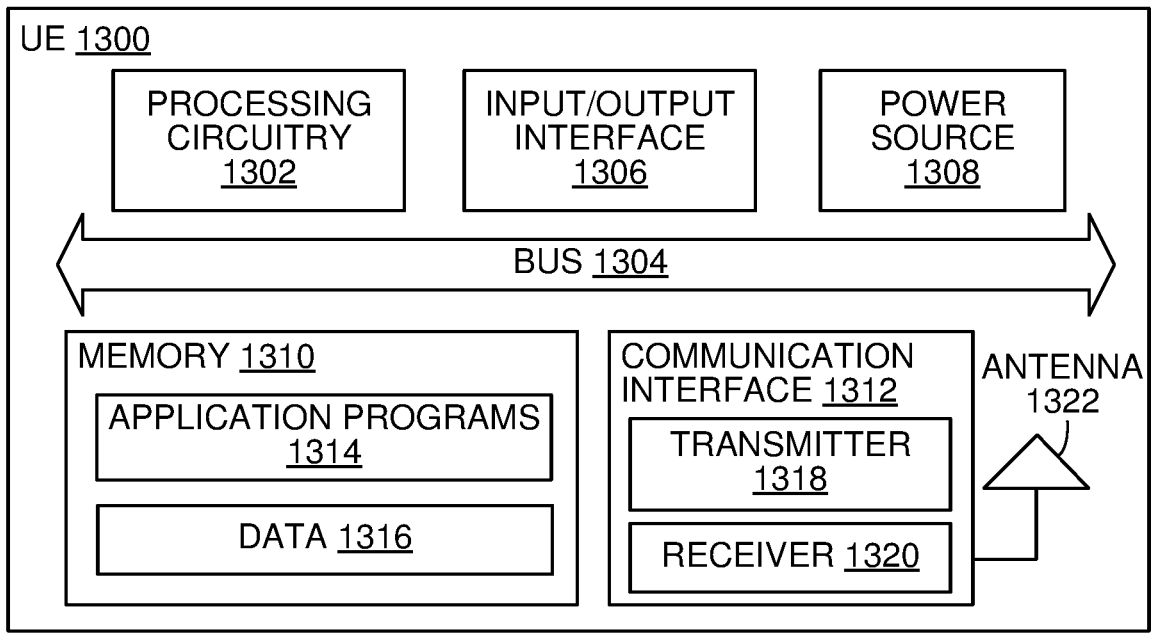
FIG. 13 is a block diagram of a user equipment in accordance with some embodiments

FIG. 13 shows a UE 1300 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over $I_P$ (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 13. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs).

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1300 shown in FIG. 13.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 14:
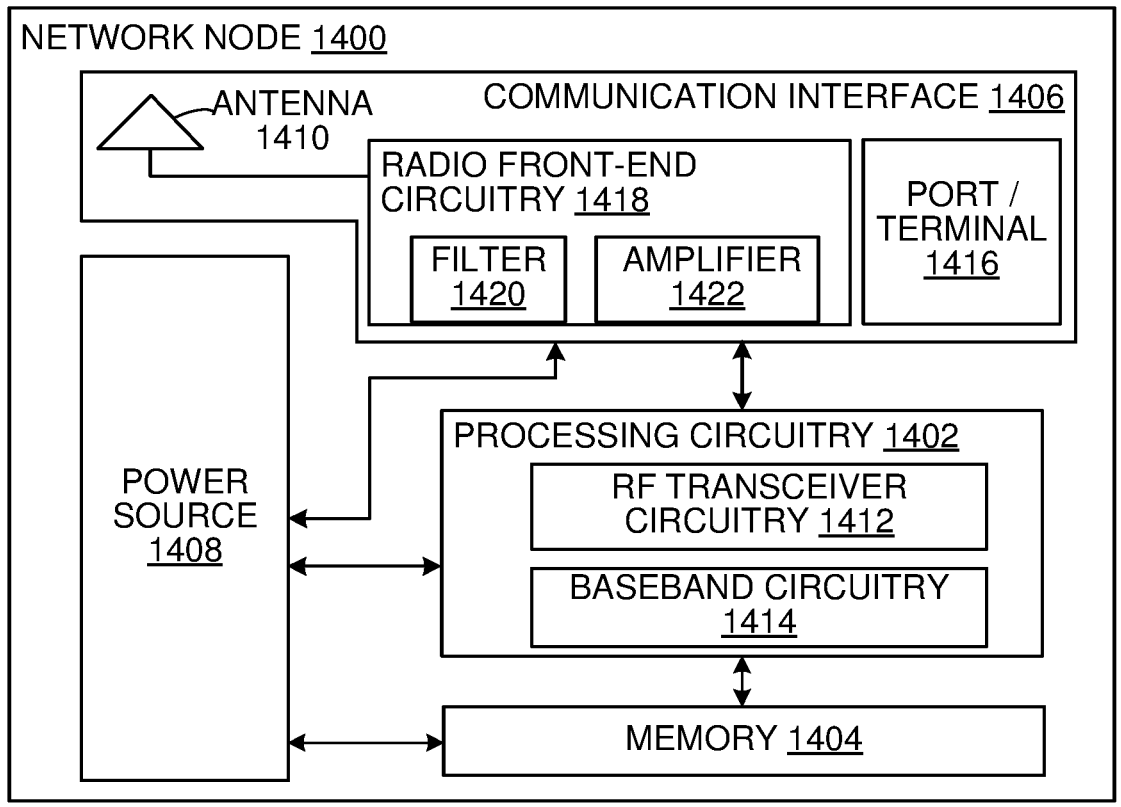
FIG. 14 is a block diagram of a network node in accordance with some embodiments.

FIG. 14 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NodeB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 14 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 15:
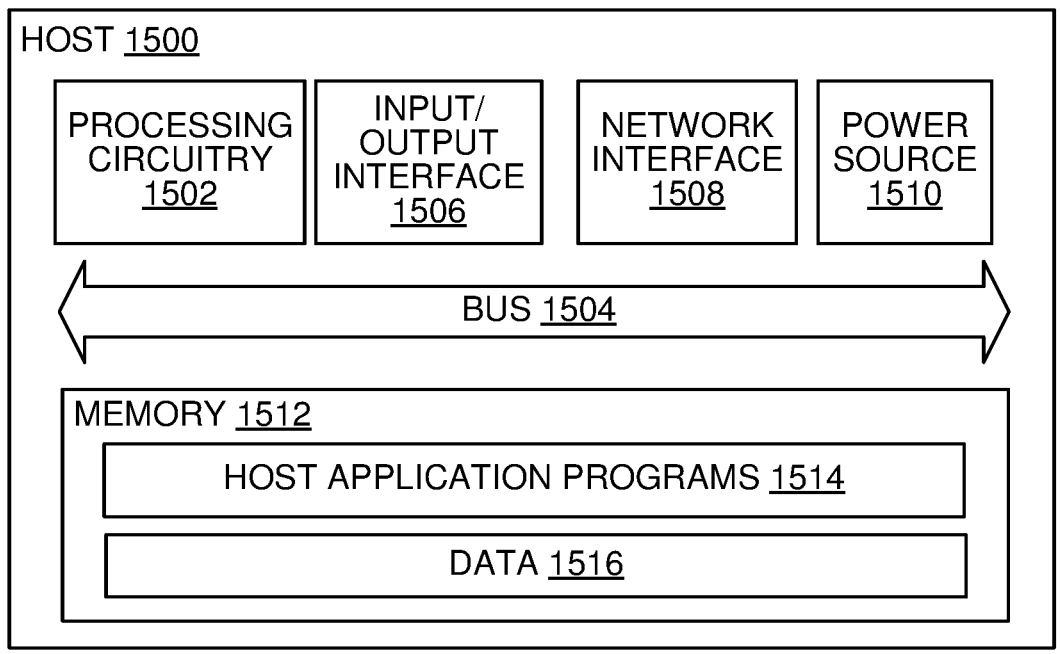
FIG. 15 is a block diagram of a host computer communicating with a user equipment in accordance with some embodiments.

FIG. 15 is a block diagram of a host 1500, which may be an embodiment of the host 1216 of FIG. 12, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 13 and 14, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 16:
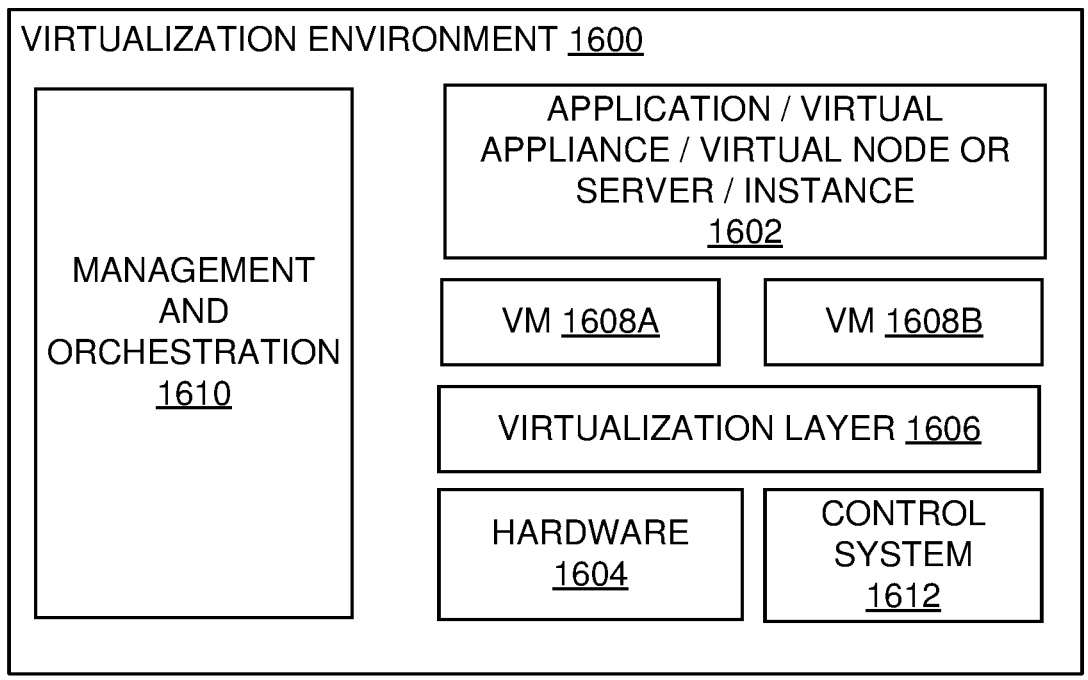
FIG. 16 is a block diagram of a virtualization environment in accordance with some embodiments.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs 1608a and 1608b (one or more of which may be generally referred to as VMs 1608), and/or perform any of the functions, features and/or benefits described in relation with some embodiments described herein. The virtualization layer 1606 may present a virtual operating platform that appears like networking hardware to the VMs 1608.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 17:
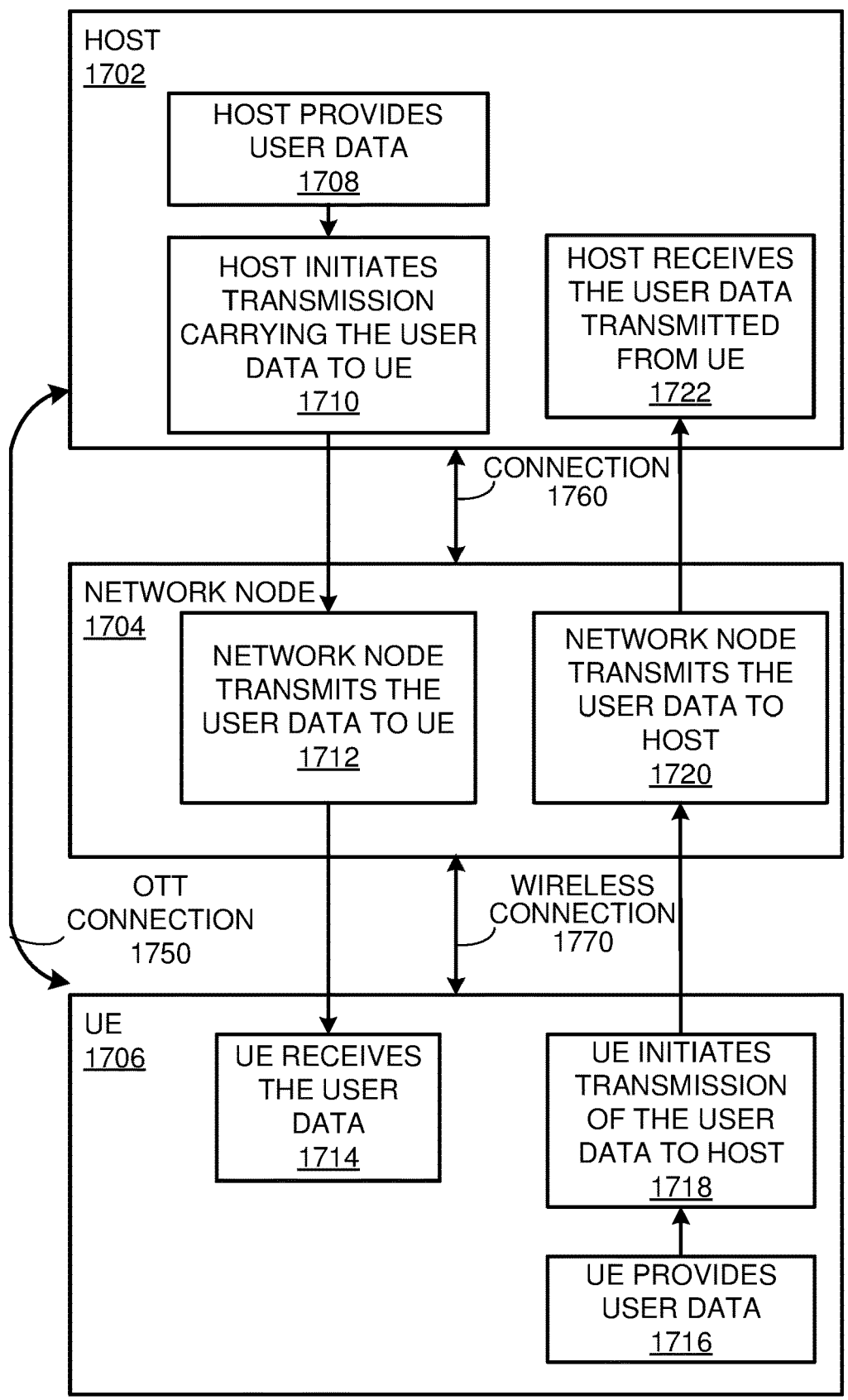
FIG. 17 is a block diagram of a host computer communicating via a base station with a user equipment over a partially wireless connection in accordance with some embodiments in accordance with some embodiments.

FIG. 17 shows a communication diagram of a host 1702 communicating via a network node 1704 with a UE 1706 over a partially wireless connection in accordance with some embodiments. Example implementations, in accordance with various embodiments, of the UE (such as a UE 1212a of FIG. 12 and/or UE 1300 of FIG. 13), network node (such as network node 1210a of FIG. 12 and/or network node 1400 of FIG. 14), and host (such as host 1216 of FIG. 12 and/or host 1500 of FIG. 15) discussed in the preceding paragraphs will now be described with reference to FIG. 17.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 12) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

One or more of the various embodiments improve the performance of OTT services provided to the UE 1706 using the OTT connection 1750, in which the wireless connection 1770 forms the last segment. More precisely, the teachings of these embodiments may allow different beam-space transformation variants to be used by both O-DU and O-RU to conduct beamspace compression of BFWs, which are optimized for different antenna array configuration. The configuration chosen can better match the transformation to the antenna array configuration, thereby improve beamforming performance and/or increasing compression. The transformation complexity can be also reduced in some cases. In some examples, this can be advantageous in a multi-vendor environment when the O-DU and O-RU are from different vendors.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes; the sensors may participate in the measurement procedure by supplying values of the monitored quantities exemplified above, or supplying values of other physical quantities from which software may compute or estimate the monitored quantities. The reconfiguring of the OTT connection 1750 may include message format, retransmission settings, preferred routing etc.; the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method of operating a first network entity of a communications network, the method comprising:
generating compressed beamforming weights (BFWs) based on a transformation configuration, the transformation configuration being based on one or more parameters of an antenna array associated with a second network entity of the communications network, the parameters including a parameter that is separate from a total number of antenna ports in the antenna array; and
transmitting an indication of the compressed BFWs to the second network entity via a fronthaul between the first network entity and the second network entity.

2. The method of claim 1, further comprising:
determining the transformation configuration based on the one or more parameters of the antenna array associated with the second network entity of the communications network.

3. The method of claim 1, wherein the one or more parameters of the antenna array comprise at least one of: a number of polarizations, a number of antenna ports in a vertical direction, and a number of antenna ports in a horizontal direction.

4. The method of claim 1, wherein the antenna array comprises a dual polarized antenna array, and
wherein generating the compressed BFWs comprises performing an antenna-space to beam-space transformation using one half-size one-dimensional transform per polarization.

5. The method of claim 1, wherein the antenna array comprises a rectangular planar antenna array with M antenna ports in the vertical direction and N antenna ports in the horizontal direction, and
wherein generating the compressed BFWs comprises performing an antenna-space to beam-space transformation using one full-size two-dimensional transform over all antenna ports cross vertical and horizontal dimensions of the rectangular planar antenna array.

6. The method of claim 1, wherein the antenna array comprises a dual polarized rectangular planar antenna array with M antenna ports in the vertical direction and N antenna ports in the horizontal direction, and
wherein generating the compressed BFWs comprises performing an antenna-space to beam-space transformation using one half-size two-dimensional transform per polarization cross vertical and horizontal dimensions of the dual polarized rectangular planar antenna array.

7. The method of claim 1, wherein the antenna array comprises a dual polarized rectangular planar antenna array with M antenna ports in the vertical direction and N antenna ports in the horizontal direction, and
wherein generating the compressed BFWs comprises performing an antenna-space to beam-space transformation using one full-size three-dimensional transform over all antenna ports cross vertical and horizontal dimensions of the dual polarized rectangular planar antenna array.

8. The method of claim 1, wherein the antenna array comprises a dual polarized antenna array, and
wherein generating the compressed BFWs comprises performing an antenna-space to beam-space transformation using one full-size two-dimensional transform over all antenna ports cross antenna port and polarization dimensions of the dual polarized antenna array.

9. The method of claim 1, wherein generating the compressed BFWs comprises performing an antenna-space to beam-space transformation using at least one of a discrete Fourier transform (DFT) and a singular value decomposition (SVD).

10. The method of claim 1, further comprising:
transmitting an indication of the transformation configuration to the second network entity via at least one of a management plane and a control plane.

11. The method of claim 10, wherein the transformation configuration comprises a transformation matrix, and
wherein transmitting the indication of the transformation configuration comprises transmitting an indication of an upper or a lower triangle of the transformation matrix to the second network entity.

12. The method of claim 10, further comprising:
receiving a list of transformation configurations supported by the second network entity,
wherein transmitting the indication of the transformation configuration comprises transmitting an indication of an index in the list of transformation configurations.

13. The method of claim 2, further comprising:
receiving a list of transformation configurations supported by the second network entity,
wherein determining the transformation configuration comprises determining the transformation configuration based on the one or more parameters of the antenna array and the list of transformation configurations.

14. The method of claim 1, wherein the communications network comprises an open-radio access network (O-RAN)
wherein the first network entity is an O-RAN distributed unit (O-DU) and
wherein the second network entity is an O-RAN radio unit (O-RU).

15. A first network entity operating in a communications network, the network entity comprising:
processing circuitry; and
memory coupled to the processing circuitry and having instructions stored therein that are executable by the processing circuitry to cause the first network entity to perform operations comprising:
generating compressed beamforming weights (BFWs) based on a transformation configuration, the transformation configuration being based on one or more parameters of an antenna array associated with a second network entity of the communications network, the parameters including a parameter that is separate from a total number of antenna ports in the antenna array; and
transmitting an indication of the compressed BFWs to the second network entity via a fronthaul between the first network entity and the second network entity.

16. The first network entity of claim 15, wherein the instructions stored in the memory are executable by the processing circuitry to cause the first network entity to perform further operations comprising:
determining the transformation configuration based on the one or more parameters of the antenna array associated with the second network entity of the communications network.

17. The first network entity of claim 15, wherein the one or more parameters of the antenna array comprise at least one of: a number of polarizations, a number of antenna ports in a vertical direction, and a number of antenna ports in a horizontal direction.

18. The first network entity of claim 15, wherein the antenna array comprises a dual polarized antenna array, and
wherein generating the compressed BFWs comprises performing an antenna-space to beam-space transformation using one half-size one-dimensional transform per polarization.

19. The first network entity of claim 15, wherein the antenna array comprises a rectangular planar antenna array with M antenna ports in the vertical direction and N antenna ports in the horizontal direction, and
wherein generating the compressed BFWs comprises performing an antenna-space to beam-space transformation using one full-size two-dimensional transform over all antenna ports cross vertical and horizontal dimensions of the rectangular planar antenna array.

20. The first network entity of claim 15, wherein the antenna array comprises a dual polarized rectangular planar antenna array with M antenna ports in the vertical direction and N antenna ports in the horizontal direction, and wherein generating the compressed BFWs comprises performing an antenna-space to beam-space transformation using one half-size two-dimensional transform per polarization cross vertical and horizontal dimensions of the dual polarized rectangular planar antenna array.

21. A computer program product comprising a non-transitory storage medium including program code to be executed by processing circuitry of a first network entity operating in a communications network, whereby execution of the program code causes the first network entity to perform operations comprising:

generating compressed beamforming weights (BFWs) based on a transformation configuration, the transformation configuration being based on one or more parameters of an antenna array associated with a second network entity of the communications network, the parameters including a parameter that is separate from a total number of antenna ports in the antenna array; and transmitting an indication of the compressed BFWs to the second network entity via a fronthaul between the first network entity and the second network entity.

22. A non-transitory computer-readable medium having instructions stored therein that are executable by processing circuitry of a first network entity operating in a communications network to cause the first network entity to perform operations comprising:

generating compressed beamforming weights (BFWs) based on a transformation configuration, the transformation configuration being based on one or more parameters of an antenna array associated with a second network entity of the communications network, the parameters including a parameter that is separate from a total number of antenna ports in the antenna array; and transmitting an indication of the compressed BFWs to the second network entity via a fronthaul between the first network entity and the second network entity.

* * * * *